United States Patent
Wheeler et al.

[11] 3,904,164
[45] Sept. 9, 1975

[54] SUCTION MEANS FOR ATTACHING ARTICLES TO ROAD VEHICLES

[76] Inventors: Frederick Charles Wheeler, 8 Stambrook Pk., Bath; Barry Edward Vosper Staples, 2 and 3, Great Pulteney St., London, both of England

[22] Filed: Mar. 7, 1974

[21] Appl. No.: 449,087

[30] Foreign Application Priority Data
Mar. 7, 1973 United Kingdom............... 11079/73

[52] U.S. Cl. ............................................. 248/362
[51] Int. Cl.² ...................................... F16M 13/00
[58] Field of Search ........ 248/206 R, 362, 363, 467, 248/346; 224/42.1 R, 42.1 E, 42.1 F

[56] References Cited
UNITED STATES PATENTS

| | | | |
|---|---|---|---|
| 1,840,400 | 1/1932 | Lebherz | 248/362 |
| 2,009,721 | 7/1935 | Williams | 248/362 X |
| 2,047,658 | 7/1936 | Zaiger | 248/206 R |
| 2,233,870 | 3/1941 | Muter | 248/206 R |
| 2,370,938 | 3/1945 | Cohen | 248/206 R UX |
| 2,634,077 | 4/1953 | Van Dusen | 248/363 X |
| 3,765,638 | 8/1973 | Harrison | 248/363 |

FOREIGN PATENTS OR APPLICATIONS

| | | | |
|---|---|---|---|
| 610,394 | 3/1935 | Germany | 248/206 R |
| 906,624 | 9/1962 | United Kingdom | 248/206 R |
| 1,273,909 | 7/1968 | Germany | 248/362 |

*Primary Examiner*—William H. Schultz
*Attorney, Agent, or Firm*—Cushman, Darby & Cushman

[57] ABSTRACT

Suction means for supporting articles upon road vehicles comprising a resilient and flexible suction pad mounted at one end of a hollow cylindrical support member and a platform mounted at the other end of the support member with two upstanding walls at the edges of the platform at right angles to one another and the platform, and manually operated mechanical means within the support member for moving the centre of the pad towards the platform to cause the pad to assume a saucer shape.

6 Claims, 8 Drawing Figures

SUCTION MEANS FOR ATTACHING ARTICLES TO ROAD VEHICLES

The invention relates to suction means for attaching articles to road vehicles, and in particular but not exclusively to means for attaching load supporting racks to the roof or boot of motor cars.

The traditional method of carrying articles on the roof of a motor car is to provide a rectangular metal rack supported usually at its corners upon pads made of rubber or other elastomeric material which will not damage the surface upon which they rest, and to secure the rack by straps which at one end engage the rack and at the other end engage the gutter usually provided along the sides of the roof.

Sometimes these pads are slightly hollow at the surface destined to make contact with the roof, and as a result a slight suction effect is produced as the straps are tightened up, but when the straps are removed, the suction effect is so slight that it is completely ineffective in retaining a loaded rack in position upon a moving vehicle, and merely acts to assist in preventing the pads from sliding from their desired position.

The object of the present invention is to provide suction means for attaching articles to road vehicles which are effective without the disadvantage of having to provide straps or other attaching means.

The invention consists in suction means for supporting articles upon road vehicles comprising a suction pad of resilient and flexible material, a hollow support member to one end of which the pad is attached, a platform attached to the other and opposite end of the support member, and parallel to the suction pad, two upstanding walls upon the platform at right angles to one another and to the platform and adjacent the edges of the platform, a metallic member projecting from the side of the pad adjacent the support member, and means associated with the metallic member which by manual operation causes the metallic member to be moved towards the platform to cause the pad to adopt a saucer shape and thus provide a sub-atmospheric pressure therein when the pad is placed in contact with a smooth impervious surface upon the vehicle.

The invention further consists in suction means as set forth in the preceding paragraph in which the metallic member is provided with at least one aperture through which is positioned the cranked portion of a cranked rod, two diametrically affixed holes in the support member which act as bearings for the cranked rod and a cranked handle at one end of the cranked rod for rotating the rod to move the metallic member towards the platform.

The platform is preferably provided with a domed portion co-axial with the pad.

The invention still further consists in suction means as set forth above, in which the metallic member is a screw-threaded rod, upon which is provided a wing nut, the wing nut bearing upon the surface of an abutment member around a hole for the screw-threaded rod, the abutment member being rigidly attached to the support member and an aperture in the platform for the insertion of one's fingers to rotate the nut and thus move the metallic member towards the platform.

It is preferable that the surface of the pad destined to contact the road vehicle be slightly convex when in the relaxed position.

The accompanying drawings show, by way of example only, embodiments of the invention in which FIG. 1 is a side elevation of one embodiment of the invention.

FIG. 7 is a section on the line 7 — 7 of FIG. 6 while

Figure 1:
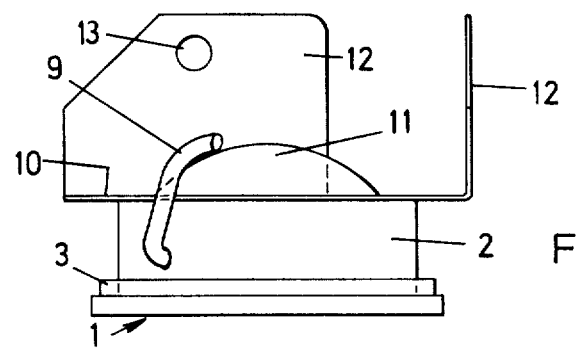
Figure 2:
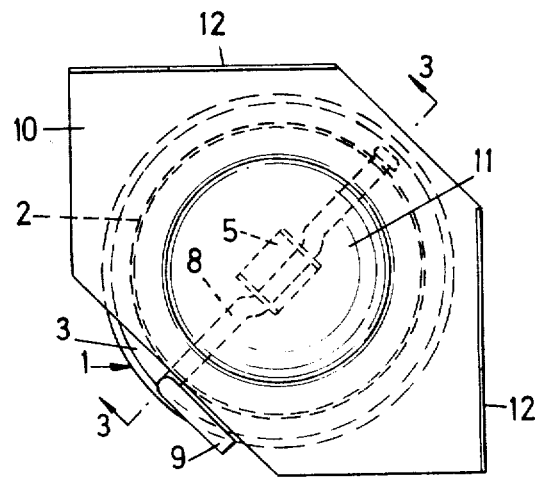
FIG. 2 is a plan view of the embodiment of FIG. 1.
Figure 3:
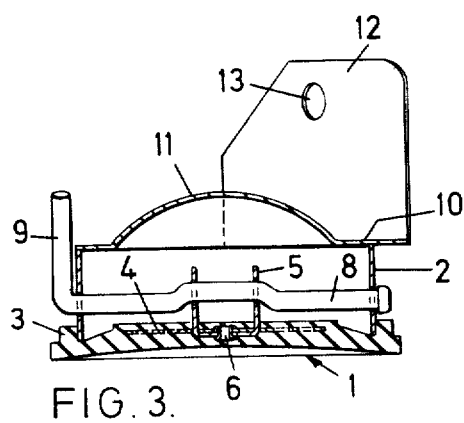
FIG. 3 is a cross section on the line 3 — 3 of FIG. 2, with the pad flexed by the crank means.

It may be seen from FIGS. 1, 2 and 3 that the suction means comprises a flexible pad 1 of rubber, synthetic resin or other elastomeric material of such a nature as will readily adopt a saucer like shape when induced to do so by the mechanical means provided and yet will retain a considerable load when attached to a vehicle by the suction provided, and yet will return to a substantially flat configuration when allowed to do so.

The pad 1 is retained upon the open end of the cylindrical drum 2 by means of an upstanding circular rim 3 around the periphery of the pad 1 and is provided with a perforated reinforcing disc 4 of metal which embedded within the pad when it is formed, and which besides giving extra strength to the pad provides means to which the mechanical means is attached.

Figure 5:
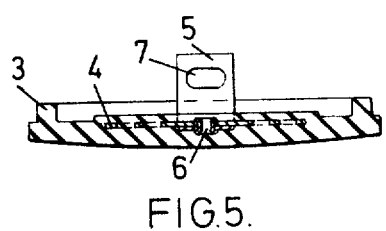
FIG. 5 is a section of the pad above showing the reinforcement and means of attaching the projecting means.
Figure 4:
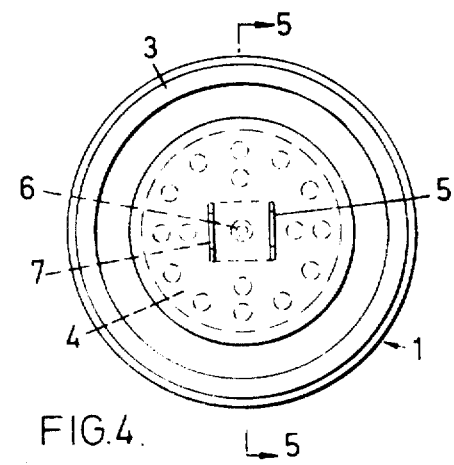
FIG. 4 is a plan view of the inner surface of the pad showing the positioning of the reinforcement disc.

In the construction shown in FIGS. 1 - 5 there is attached to the reinforcement disc 4 a U-shaped member 5 the limbs of which pass through slots in the disc 4 and is attached thereto by means of a rivet 6. Each of the limbs are provided with a hole 7 through which passes a cranked rod 8 which is rotatable in holes in the opposite sides of the drum 2 by means of a cranked handle 9. When the handle is in the position as shown in FIG. 3 the U-Shaped member is pulled upwards by the cranked rod 8 and the lower surface of the pad 1 is rendered concave thereby producing a substantial suction upon the surface to which the device is attached. When the handle is moved through 180° the pad is allowed to assume its relaxed configuration as shown in FIG. 5.

It is preferred to form the under surface of the pad convex as shown in FIG. 5 so that when the pad is applied to the surface to which the device is to be attached, air is progressively squeezed radially outwards as the lever is operated and thereby a minimum quantity of air is retained within the device and the greatest possible suction obtained. However, the device will still operate in an efficient manner if the under surface of the disc is planar, but it is preferable that it should not be concave. The provision of a convex surface on the device when new will compensate for any tendency for the under surface to become concave after repeated use.

The upper end of the drum may be provided, for example, with a platform 10 which may be provided with a domed portion 11 co-axial with the pad so that any load placed on the platform will load the pad symmetrically. So as to be able to attach the load to the platform there are provided in the constructions illustrated in FIGS. 1 - 7 two upstanding walls 12 with holes 13 by which the load may be tied to the walls. The walls are preferably positioned at right angles to one another.

Figure 6:
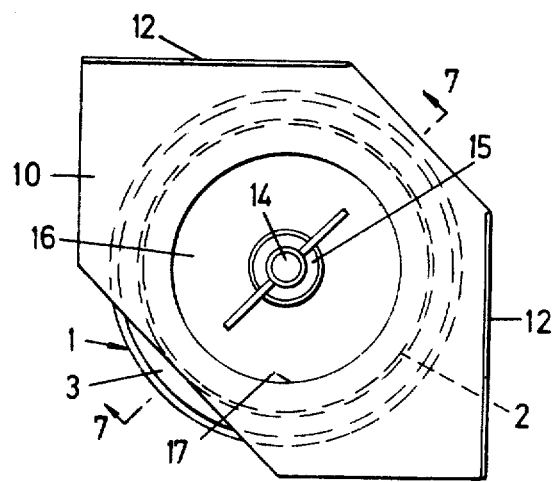
FIG. 6 is a plan view of an alternative embodiment incorporating a nut and screw arrangement.
Figure 7:
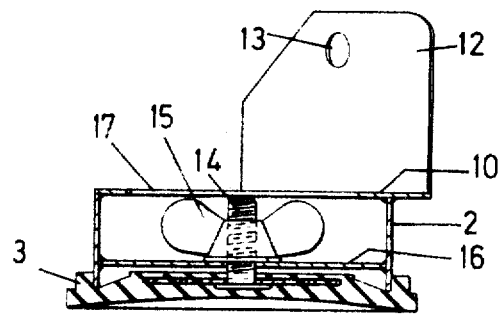

In the modified form of construction shown in FIGS. 6 and 7 the mechanical means for lifting the centre of the pad 1 is a screw-threaded member 14 on which is threaded a wing nut 15 which rests upon the circular disc or strip 16, the member 14 passing through a clearance hole therein. The wing nut 15 is rotated by passing the fingers through the hole 17.

Figure 8:
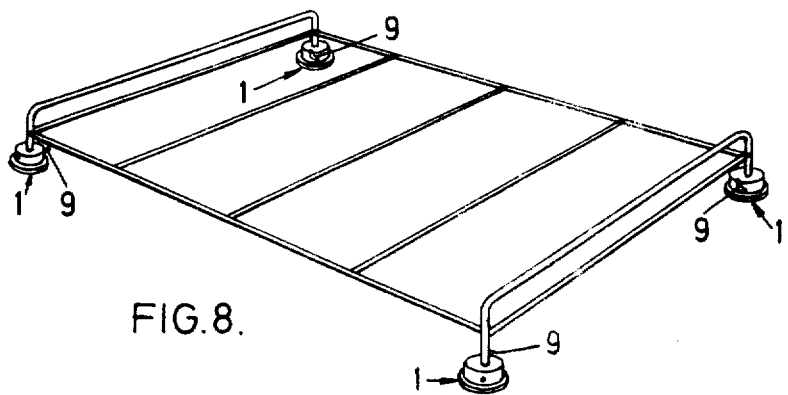
FIG. 8 is a perspective view of a roof rack to which four suctions means are attached.

In FIG. 8 there is shown a perspective view of a roof rack to which are attached four suction means of the kind which are operated in the manner as described with reference to the first embodiment, namely by means of a cranked bar. The size and shape of the rack may be varied to suit different circumstances and may have more than firm suction means when it is long, while the rack may be short when designed to be supported upon the boot of a car.

The two specific mechanical means hereinbefore described are shown by way of example only, and the invention is not limited thereto. For example, cam means may be alternatively used to urge the pad into a saucer shape, or other means for producing like motion may be substituted as desired.

The suction means can be applied to any suitable surface of a road vehicle and is not limited to the supporting of loads upon the roof or boot. For example, two or more such devices may be attached to the side of a van to support ladders, pieces of timber, constructional members, and so on and be positioned as is most appropriate for the purpose and can be fastened either directly to such items or support a frame or bars to which the items may be attached as is most convenient.

In the examples illustrated in FIGS. 1 – 7 the suction means are provided with walls 12 for the convenient supporting of rectangular objects on the roof of a vehicle, but it is to be understood that the suction means may be terminated with any arrangement which is suitable for supporting and/or attaching a specific load thereto.

It will therefore be appreciated that the above description is by way of example only and that details may be varied without departing from the scope of the invention claimed.

We claim:

1. Suction means for supporting an article comprising a suction pad of resilient and flexible material, a hollow support member to one end of which the pad is attached, a platform attached to the other and opposite end of the support member, a metallic member projecting from the side of the pad adjacent the platform, aperture means through the metallic member within which is positioned a cranked portion of a cranked rod, two diametrically opposed holes in the support member which act as bearings for the cranked rod and a lever handle at one end of the cranked rod for rotating the rod to move the metallic member towards the platform to cause the pad to adopt a saucer shape and thus provide a sub-atmospheric pressure therein when the pad is placed in contact with a smooth impervious surface, wherein said platform is provided with two upstanding walls and a dome means for supporting a load, said walls being at right angles to said platform and at an angle to each other, said dome means being coaxial with said paid so that a load placed on said suction means will be retained by said walls and supported by said dome means so as to distribute the load on said pad symmetrically.

2. Suction means for supporting an article comprising a suction pad of resilient and flexible material, a hollow support member to one end of which the pad is attached, a platform attached to the other and opposite end of the support member, a metallic member projecting from the side of the pad adjacent the platform, aperture means through the metallic member within which is positioned a cranked portion of a cranked rod, two diametrically opposed holes in the support member which act as bearings for the cranked rod and a lever handle at one end of the cranked rod for rotating the rod to move the metallic member towards the platform to cause the pad to adopt a saucer shape and thus provide a sub-atmospheric pressure therein when the pad is placed in contact with a smooth impervious surface, characterized in that the suction means is adapted to support and article upon a road vehicle by being provided with two upstanding walls upon the platform at right angles to the platform and at an angle to one another and adjacent the edges of the platform and a domed portion upon the platform co-axial with the pad.

3. Suction means as claimed in claim 2 in which the pad is moulded from an elastomeric material and is provided with a perforated disc like metal reinforcement embedded therein to which is attached the metallic member.

4. Suction means as claimed in claim 2 in which each upstanding wall is provided with an aperture through which may be passed a cord for attaching the article to the suction means.

5. Suction means as claimed in claim 3 in which that surface of the pad destined to contact the road vehicle is slightly convex when in the relaxed position.

6. Suction means as claimed in claim 2 in which the means associated with the metallic member is adapted to cause the surface of the pad destined to contact the road vehicle to become slightly convex prior to the application of the suction means to the road vehicle.

* * * * *